United States Patent [19]

Bullerdiek

[11] 4,126,151

[45] Nov. 21, 1978

[54] IMPACT SENSITIVE SAFETY-RELIEF SYSTEM FOR TANK CARS

[75] Inventor: Wendell A. Bullerdiek, East Aurora, N.Y.

[73] Assignee: Calspan Corporation, Buffalo, N.Y.

[21] Appl. No.: 775,499

[22] Filed: Mar. 8, 1977

[51] Int. Cl.² .................................................. F16K 17/36
[52] U.S. Cl. .................................... 137/43; 137/68 R; 220/89 A; 220/266; 222/500
[58] Field of Search ................... 137/38, 43, 45, 68 R, 137/69, 70, 71, 797; 220/89 A, 266; 222/500; 280/734, 737

[56] References Cited

U.S. PATENT DOCUMENTS

| | | | |
|---|---|---|---|
| 568,680 | 9/1896 | Henderson | 220/89 A |
| 788,744 | 5/1905 | Wright | 137/68 R X |
| 2,860,003 | 11/1958 | Hodges | 280/734 X |
| 3,105,506 | 10/1963 | Beeby | 137/38 |
| 3,778,085 | 12/1973 | Lipkin | 137/45 X |

*Primary Examiner*—Martin P. Schwadron
*Assistant Examiner*—Richard Gerard
*Attorney, Agent, or Firm*—Allen J. Jaffe; David J. Zobkiw

[57] ABSTRACT

A frangible member isolates a rupture disc from a pressurized fluid system. Under abnormal conditions such as might be encountered in a crash or derailment, the frangible member breaks and thereby permits direct contact of the rupture disc with the fluid system. If the pressure is sufficient, this causes the rupturing of the disc and the venting of the fluid system down to atmospheric pressure.

5 Claims, 3 Drawing Figures

IMPACT SENSITIVE SAFETY-RELIEF SYSTEM FOR TANK CARS

Existing tank cars are equipped with pressure relief systems which are intended to prevent excessive internal pressure within the tank shell which could produce catastrophic failure. Under collision and/or derailment conditions, however, tank cars may receive impact loads which may impair the structural integrity of the shell. This may result in a catastrophic rupture of the shell at pressures below the set pressure of the primary relief system.

Where a tank car contains flammable materials such as petroleum products under pressure, a damaged tank car will be a potential bomb in the case of fire due to the flammable contents being under pressure. Even if the pressure relief system was activated, the contents of the tank car would be relieved only to a pressure level dictated by the relief system. While a rupture disc type of relief system guarantees the venting of the contents of the tank car to atmospheric pressure, it would be subject to rupture due to non-hazardous conditions such as overpressurizing the tank car in filling, increased tank pressure due to an increase in ambient temperature, etc. which are readily handled by conventional relief systems.

It is an object of this invention to provide an impact sensitive relief system for depressurizing a tank car in a collision and/or derailment.

It is a further object of this invention to provide pressure relieving structure which is isolated from the pressurized system by a frangible member.

It is an additional object of this invention to provide a secondary relief system for a pressurized tank car which is actuated in a collision and/or derailment and which vents the tank car to atmospheric pressure. These objects, and others as will become apparent hereinafter, are accomplished by the present invention.

Basically, the impact sensitive safety relief system of the present invention complements existing primary relief systems. A safety-relief valve or rupture disc is mounted in a blind port, and is thus isolated from the internal pressure of the tank car under normal transportation conditions. The blind port is provided with a weakened section which is frangible upon collision and/or derailment to thereby communicate the internal pressure of the tank car with the safety-relief valve or rupture disc.

BRIEF DESCRIPTION OF THE DRAWINGS

For a fuller understanding of the present invention, reference should now be had to the following detailed description thereof taken in conjunction with the accompanying drawings wherein.

DESCRIPTION OF THE PREFERRED EMBODIMENT

Figure 2:
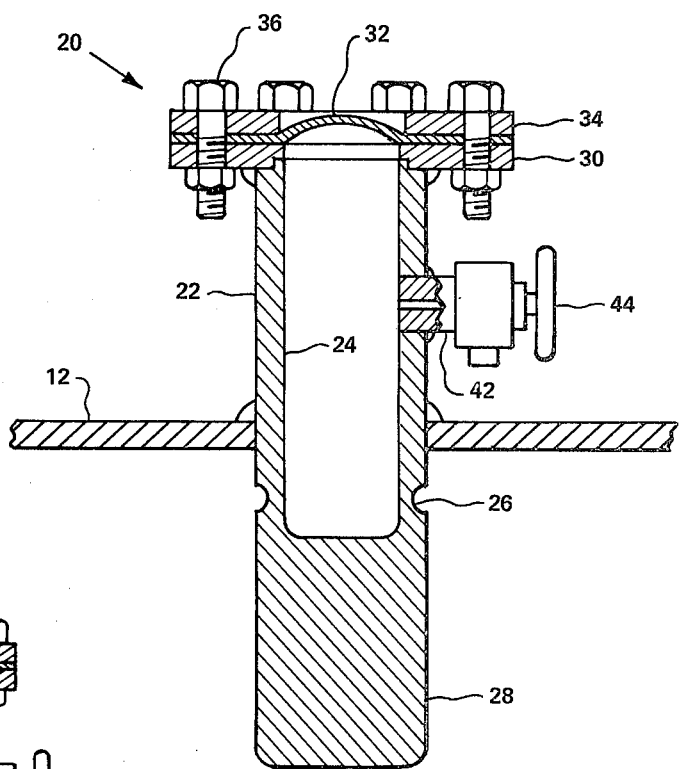
FIG. 2 is a sectional view showing the safety-relief system in its normal position.
Figure 1:
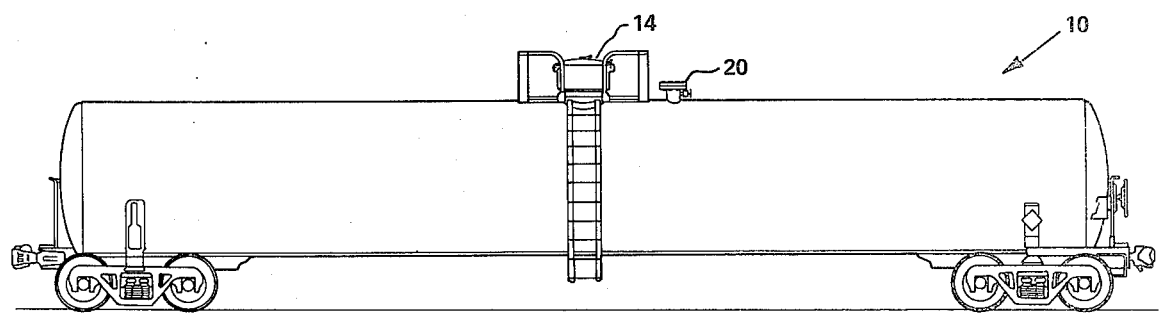
FIG. 1 is a side view of a railroad tank car employing the safety-relief system of the present invention.

In FIG. 1, the numeral 10 generally indicates a conventional railroad tank car. The tank car 10 has been modified to the extent of locating the safety-relief system 20 of the present invention therein as an additional feature. Safety-relief system 20 has a venting capacity comparable to that of the paired conventional relief valve which is located in the center of a manway cover plate located within dome 14. As best shown in FIG. 2, the safety-relief system 20 includes a closed end cylindrical member 22 which extends through wall 12 of tank car 10 and is secured in place in a fluid-tight manner as by welding. Cylindrical member 22 has a bore 24 therein which extends to a point interior of the tank car wall 12. A preformed circumferential notch or groove 26 is formed in cylindrical member 22 at a point which corresponds to the interior of the tank car 10 and is radially outward of bore 24 and defines a frangible area. The solid portion 28 of cylindrical member 22 has a relatively high mass which is acted upon by the inertial forces developed by impact deceleration. A flange 30 is located at the open bore end of cylindrical member 22 and is integral therewith. Annular member 34 together with flange 30 and a plurality of bolts 36 coact to secure rupture disc 32 across the opening of bore 24. Line 42 communicates with bore 24 and provides a fluid path to exhaust via inspection bleed valve 44 which is a conventional manually actuated valve.

OPERATION

Figure 3:
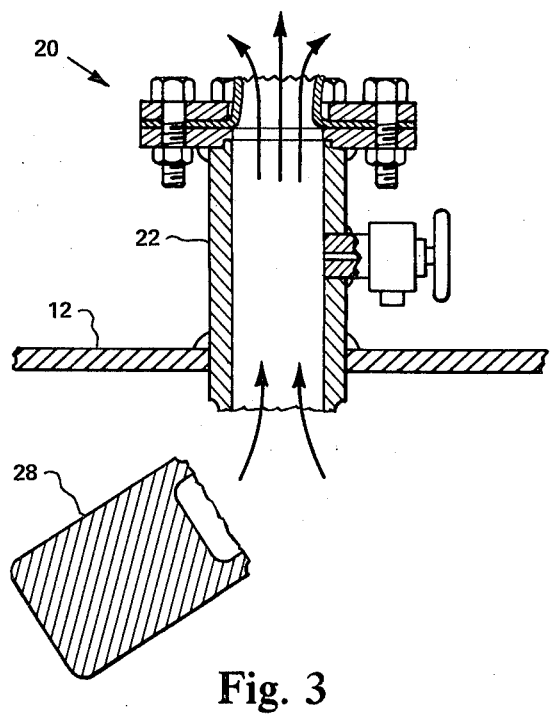
FIG. 3 is a sectional view showing the operation of the safety-relief system.

Under normal conditions, as illustrated in FIG. 2, cylindrical member 22 and rupture disc 32 are intact and bleed valve 44 is closed resulting in a closed chamber defined by bore 24 which should be at essentially atmospheric pressure. The safety relief system 20 is designed to open only if the tank car 10 has received an impact of sufficient magnitude that the structural integrity of the pressure shell or wall 12 may have been impaired. To achieve the controlled venting of the tank car 10, solid portion 28 of cylindrical member 22 has a high mass which is acted upon by the inertial forces developed by impact deceleration. The stress induced by deceleration causes the breaking of cylindrical member 22 at the preformed stress raisers defined by notch or groove 26 thereby communicating tank car pressure to bore 24 and rupture disc 32. Venting of fluid from tank car 10 will then occur if internal pressure in the tank car 10 exceeds the set-point of the rupture disc 32 as illustrated in FIG. 3. The set-point of the secondary relief system defined by rupture disc 32 is lower than that of the conventional primary system located in dome 14 to insure that catastrophic failure of a damaged tank car shell 12, which may result in a boiling liquid expanding vapor explosion and "rocketing" of car fragments, will not occur.

Control of break-off impact is obtained by varying the weight of solid portion 28, the moment arm from the groove 26 to the center of mass of solid portion 28, the depth and shape of notch or groove 26 and the material of cylindrical member 22. Since breakage of cylindrical member 22 at notch or groove 26 must be accompanied by a sufficient internal pressure in tank car 10 to rupture the rupture disc 32, it is desirable to test the integrity of cylindrical member 22 at times such as prior to loading tank car 10. Testing can be done by simply manually opening bleed valve 44 or, if desired, a pressure gage can be connected to the outlet of valve 44 prior to opening.

Although a rupture disc has been illustrated and described, a relief valve can be used but it should permit the complete depressurizing of the tank car. Direct release to the atmosphere may also be employed, if no form of pressure control is desired, by simply dispensing with the relief valve or rupture disc. While a railroad tank car has been specifically described as the area of use, the present invention may be employed wherever inertial forces acting on a pressurized system is symptomatic of a condition requiring the depressurizing of the system. Since these and other changes will occur to those skilled in the art, it is therefore intended that the scope of the present invention is to be limited only by the scope of the appended claims.

I claim:

1. An impact sensitive safety-relief system adapted for installation in the wall of a pressurized vessel including:
    housing means;
    said housing means having a thin walled section defining a blind bore which is normally at essentially atmospheric pressure and an integral solid section defining an inertia mass;
    a weakened section formed in said thin walled section of said housing means to define a frangible area;
    whereby when said solid section and said weakened section are located within a pressurized vessel, inertial forces acting on said solid section can cause the breaking of said weakened section and thereby the separation of said solid section from said thin walled section to open said bore and thereby permit fluid communication between the pressurized vessel and said bore.

2. The safety-relief system of claim 1 further including pressure responsive means for depressurizing the pressurized vessel when said weakened section has broken and the pressure in the pressurized vessel and said bore is greater than the operating pressure of said pressure responsive means.

3. The safety relief system of claim 1 where said pressure responsive means is a rupture disc.

4. An impact sensitive safety-relief system for depressurizing a pressurized vessel when subjected to inertial forces of a predetermined magnitude including:
    housing means have a bore therein;
    inertia responsive frangible means formed in said housing means and normally located in a pressurized vessel and preventing fluid communication between the pressurized vessel and said bore;
    fluid pressure responsive means normally located outside the pressurized vessel preventing fluid communication between the bore and the atmosphere;
    whereby inertial forces acting on said inertia responsive frangible means can cause the breaking of said frangible means to permit fluid communication between the pressurized vessel and said bore and said pressure responsive means can be acted upon by fluid pressure to depressurize the pressurized vessel.

5. The impact sensitive safety-relief system of claim 4 further including a valved bleed line communicating with said bore.

* * * * *